(12) United States Patent
Nuernberger et al.

(10) Patent No.: US 8,403,277 B2
(45) Date of Patent: Mar. 26, 2013

(54) ELECTRICAL BOX MOUNTING BRACKET

(75) Inventors: Eric Roland Nuernberger, Highland, IL (US); Brandon Michael Tally, Greenville, IL (US)

(73) Assignee: Cooper Technologies Company, Houston, TX (US)

( * ) Notice: Subject to any disclaimer, the term of this patent is extended or adjusted under 35 U.S.C. 154(b) by 1374 days.

(21) Appl. No.: 12/061,181

(22) Filed: Apr. 2, 2008

(65) Prior Publication Data
US 2009/0250573 A1 Oct. 8, 2009

(51) Int. Cl.
*E04G 25/00* (2006.01)

(52) U.S. Cl. ............... 248/200.1; 248/228.7; 24/528; 24/527; 174/58

(58) Field of Classification Search .............. 248/74.1, 248/57, 228.7, 906, 226.26, 229.16, 231.81, 248/200.1, 316.7, 300; 174/58; 24/3.12, 24/489, 517, 518, 527, 528
See application file for complete search history.

(56) References Cited

U.S. PATENT DOCUMENTS

| | | | | |
|---|---|---|---|---|
| 649,545 A * | 5/1900 | McConley | | 248/231.81 |
| 736,831 A * | 8/1903 | Eidt | | 248/113 |
| 749,222 A * | 1/1904 | Purdy et al. | | 403/387 |
| 1,056,759 A | 3/1913 | Mallery | | |
| 1,365,093 A * | 1/1921 | D Arcy | | 248/229.16 |
| 1,408,970 A * | 3/1922 | Ayer | | 248/231.81 |
| 1,523,744 A * | 1/1925 | Ayer | | 248/231.81 |
| 1,624,187 A * | 4/1927 | Schlafly | | 52/360 |
| 2,713,983 A | 7/1955 | Kay | | |
| 2,729,414 A | 1/1956 | Clark | | |
| 2,732,162 A | 1/1956 | McKinley | | |
| 3,019,954 A * | 2/1962 | Faltin | | 224/483 |
| 3,606,223 A | 9/1971 | Havener | | |
| 3,684,230 A | 8/1972 | Swanquist | | |
| 3,720,395 A | 3/1973 | Schuplin | | |
| 3,780,209 A * | 12/1973 | Schuplin | | 174/51 |
| 3,804,359 A * | 4/1974 | Cumber | | 248/205.1 |
| 4,362,284 A * | 12/1982 | Bolante | | 248/228.7 |
| 4,747,506 A | 5/1988 | Stuchlik, III | | |
| 4,787,587 A * | 11/1988 | Deming | | 248/205.1 |
| 4,971,280 A * | 11/1990 | Rinderer | | 248/228.7 |
| 5,004,199 A * | 4/1991 | Suk | | 248/218.4 |
| 5,386,959 A | 2/1995 | Laughlin | | |
| 5,405,111 A | 4/1995 | Medlin, Jr. | | |
| 5,619,263 A * | 4/1997 | Laughlin et al. | | 248/343 |
| 5,810,303 A * | 9/1998 | Bourassa et al. | | 248/205.1 |
| 5,954,304 A | 9/1999 | Jorgensen | | |
| 6,098,945 A | 8/2000 | Korcz | | |
| 6,386,488 B1 * | 5/2002 | Menachem | | 248/74.2 |
| 6,484,979 B1 | 11/2002 | Medlin, Jr. | | |
| 6,484,980 B2 | 11/2002 | Medlin, Sr. | | |
| 6,491,270 B1 * | 12/2002 | Pfaller | | 248/200.1 |
| 6,768,071 B1 * | 7/2004 | Gretz | | 200/297 |
| 7,073,757 B2 | 7/2006 | Johnson | | |
| 7,360,745 B2 * | 4/2008 | Nikayin et al. | | 248/216.1 |
| 2007/0063121 A1 * | 3/2007 | Oh | | 248/342 |
| 2007/0084617 A1 | 4/2007 | Dinh | | |

* cited by examiner

*Primary Examiner* — Kimberly Wood
(74) *Attorney, Agent, or Firm* — Senniger Powers LLP

(57) ABSTRACT

A bracket is disclosed for mounting an electrical box on a mounting bar. The bracket comprises a front jaw and a rear jaw. The jaws are movable toward an open position for allowing movement of the bracket relative to the mounting bar and toward a closed position for gripping the mounting bar at a selected position along the mounting bar. The jaws are biased toward the closed position. An electrical box is attached to the front jaw. In one embodiment, the front jaw, rear jaw and a spring for urging the jaws closed are integrally formed from a single piece of sheet metal.

10 Claims, 13 Drawing Sheets

ELECTRICAL BOX MOUNTING BRACKET

FIELD OF THE INVENTION

The present invention generally relates to a device for mounting an electrical box and, more particularly, to a bracket which is adjustable along a mounting bar for mounting an electrical box in any selected position along the bar.

BACKGROUND OF THE INVENTION

Electrical boxes (also referred to as "junction boxes") are used to house and protect electrical devices such as electrical outlets, switches and associated wiring when the devices are installed in a building. Typically, an electrical device is installed either by attaching the junction box containing the device directly to framing within the structure, or by attaching the box to a mounting device that is fastened to such framing. One such box mounting device is described in U.S. Pat. No. 5,209,444. The device comprises a mounting bar having fastening flaps at opposite ends of the bar for attachment to spaced apart wall studs. When the flaps are attached to the studs, the bar extends generally horizontally between the studs. The bar has a generally channel-shaped cross-section, and a plurality of box mounting openings are spaced along the length of the bar for receiving fasteners to attach an electrical box to the bar at a selected location. Another box mounting device is described in co-assigned published application Ser. No. 11/093,145, filed Mar. 29, 2005 and published on Oct. 26, 2006 as U.S. Pub. No. US2006/0237601. This publication discloses an electrical box mounting bracket which is adjustable along a mounting bar to a selected position corresponding to selected fastener openings in the bar.

SUMMARY OF THE INVENTION

This invention is directed to an improved bracket for mounting an electrical box on a mounting bar. In one embodiment, the bracket comprises front and rear jaws movable between open and closed positions, the jaws being movable toward their open position for allowing movement of the bracket relative to the mounting bar and toward their closed position for gripping the mounting bar at a selected position along the mounting bar. The jaws are biased toward their closed position. A device is provided for attaching an electrical box to the bracket.

Another aspect of this invention involves a bracket comprising a front jaw adapted for connection of an electrical box to the jaw, and a rear jaw. The front and rear jaws are movable between open and closed positions, the jaws being movable toward their open position for allowing movement of the bracket relative to the mounting bar and toward their closed position for gripping the mounting bar at a selected position along the mounting bar. A spring urges the jaws toward their closed position. The front jaw, rear jaw and spring are integrally formed from a single piece of sheet metal.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
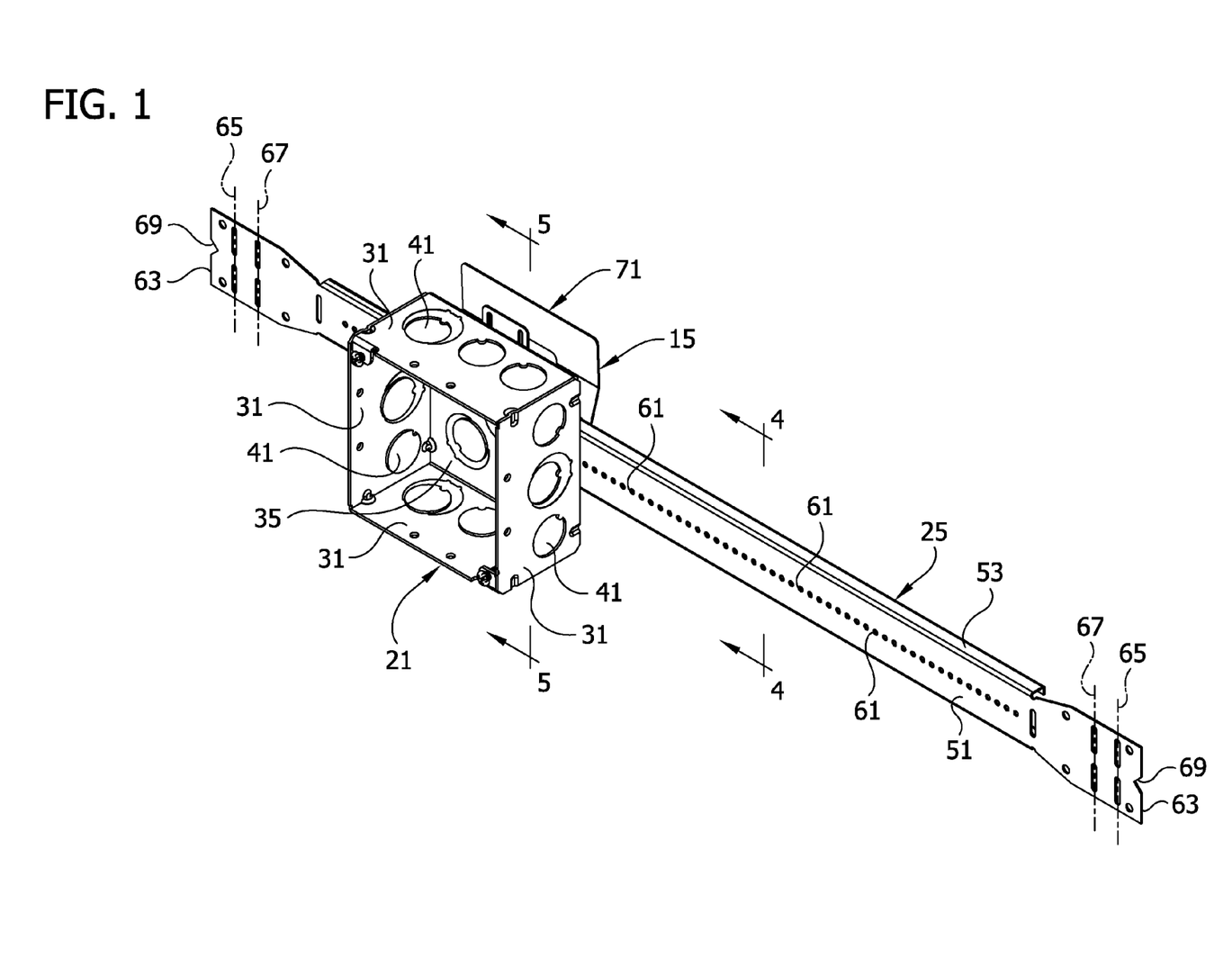
FIG. 1 is a front perspective of one embodiment of a bracket of this invention mounting an electrical box on a mounting bar.
Figure 2:
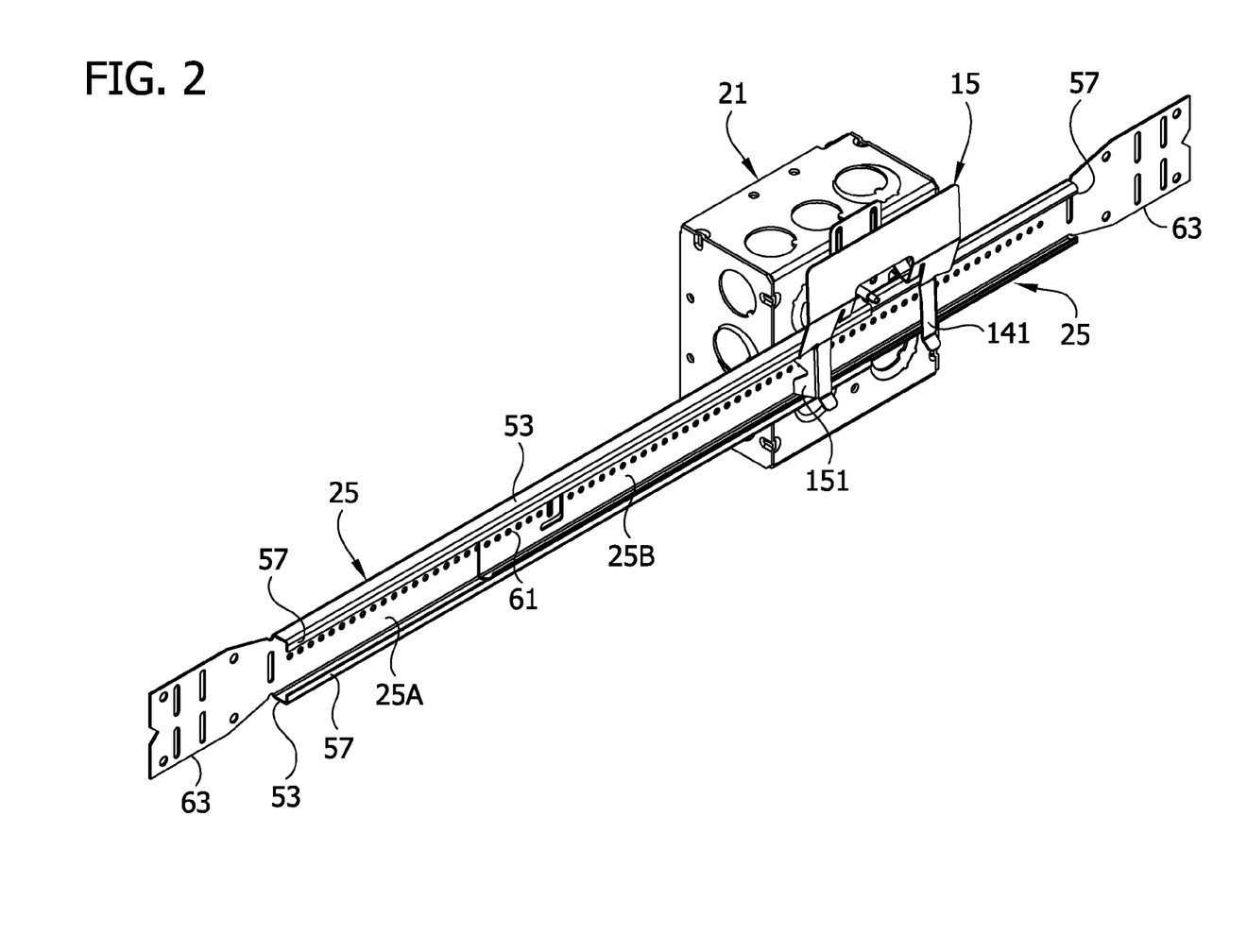
FIG. 2 is a rear perspective of the assembly of FIG. 1.

FIGS. 1 and 2 show a bracket of this invention, generally designated 15, mounting an electrical box 21 on a mounting bar 25 which is adapted to be attached in conventional fashion to wall framing comprising, for example, two spaced-apart vertical wall studs (not shown). The electrical box includes four side walls 31 and a back wall 35 which define an enclosure for receiving electrical wiring and, typically, an electrical device such as a switch. A series of knockouts 41 are provided in the walls 31, 35 of the box for the passage of wiring to and from the box. As initially mounted on the bracket 15, the mounting box 21 may be empty or pre-wired.

As illustrated in FIGS. 1 and 2, the mounting bar 25 comprises a pair of telescoping channel-shaped sections 25A, 25B, each of which has a generally vertical web 51 and generally parallel horizontal flanges 53 extending from the web. The flanges 53 have in-turned lips 57 extending from respective outer edges of the flanges generally parallel to the web 51. The two sections 25A, 25B are sized and configured for a telescoping fit of one section in the other so that the length of the bar 25 can be adjusted to the desired length depending, for example, on the spacing between the wall studs. The webs 51 of the bar sections 25A, 25B have fastener openings 61 spaced at intervals along the length of the bar. These fastener openings 61 can be used to secure the box 25 directly to the bar without the use of the bracket 15. The sections 25A, 25B have elongate extensions at opposite ends of the bar forming a pair of fastening flaps 63 which can be suitably used to fasten the mounting bar 25 to the aforementioned wall framing (e.g., wall studs). The fastening flaps 63 can be bent along different bend lines 65, 67 depending on the desired depth of the electrical box 21 relative to the front face of the wall framing, as more fully explained in U.S. Pat. No. 5,209,444 and U.S. Pub. No. US2006/0237601, both of which are incorporated by reference herein. The fastening end edges of the flaps 63 have notches 69 for locating the longitudinal centerline of the bar at a desired elevation corresponding to the desired elevation at which the electrical box 25 is to be mounted.

Figure 5:
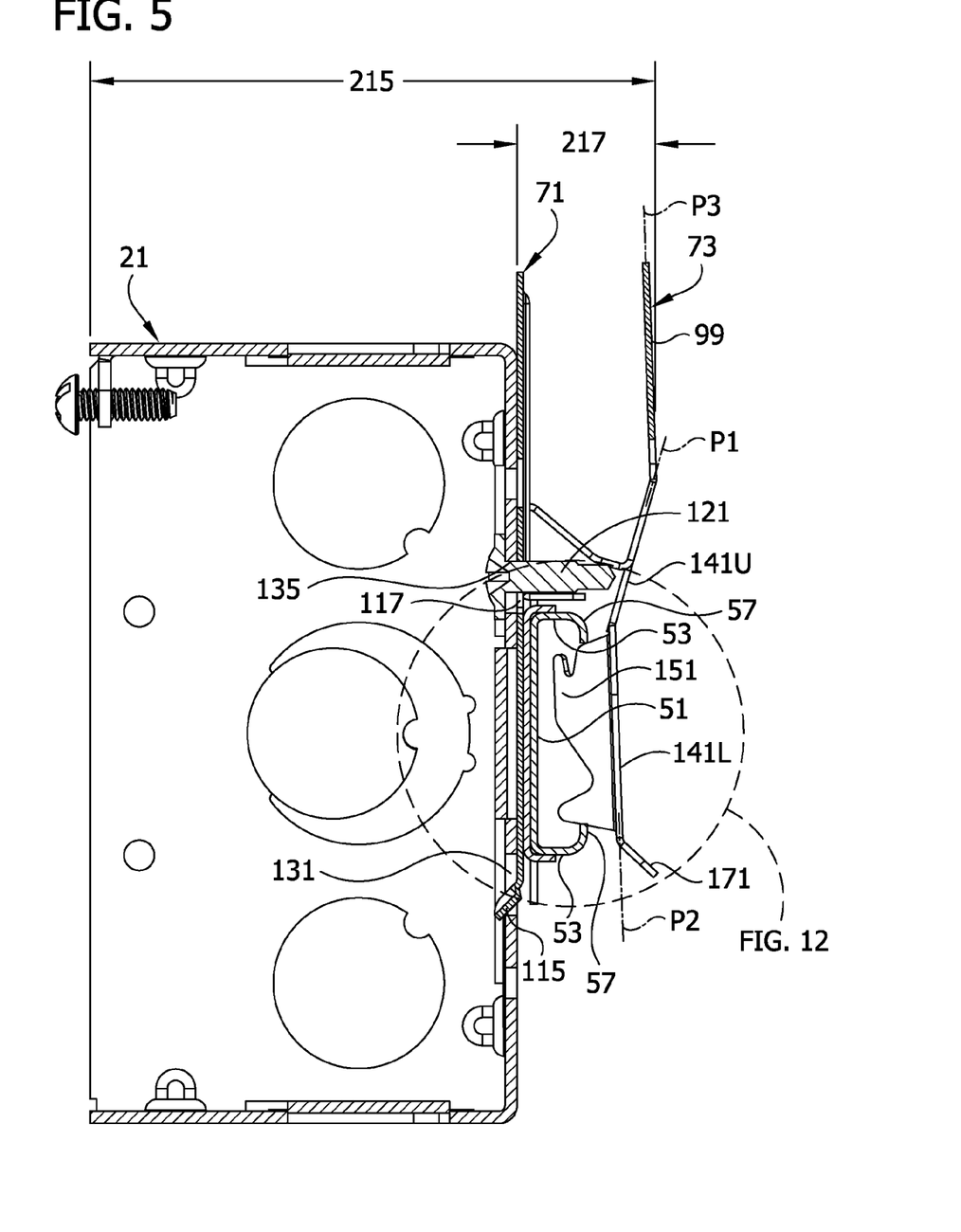
FIG. 5 is en enlarged vertical section on line 5-5 of FIG. 1 showing the front and rear jaws of the bracket in clamping contact with the mounting bar to grip it.
Figure 6:
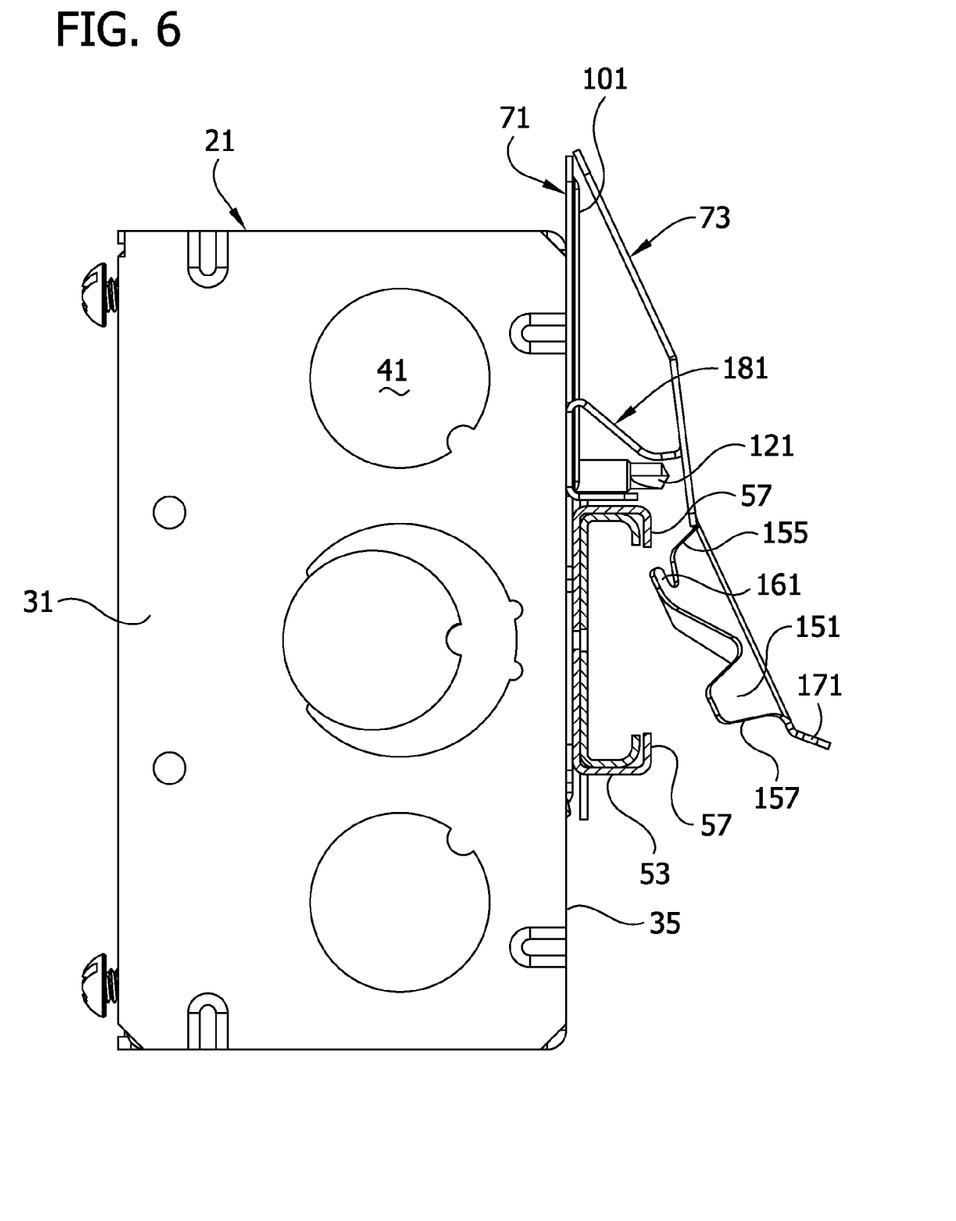
FIG. 6 is a view similar to FIG. 5 but showing the jaws in an open position to permit movement of the bracket relative to the bar.
Figure 7:
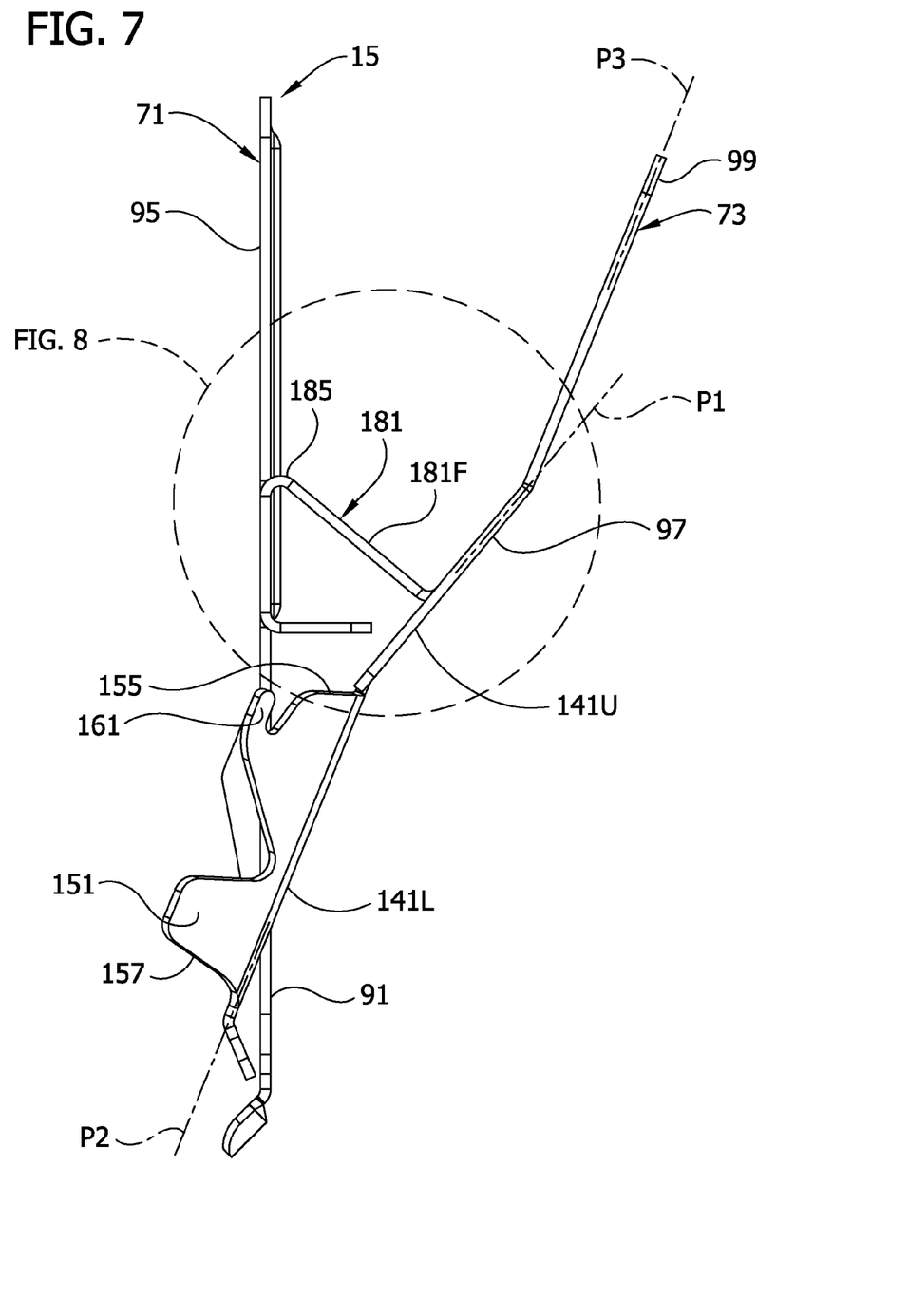
FIG. 7 is a side view of the bracket showing the jaws in a closed position.
Figure 8:
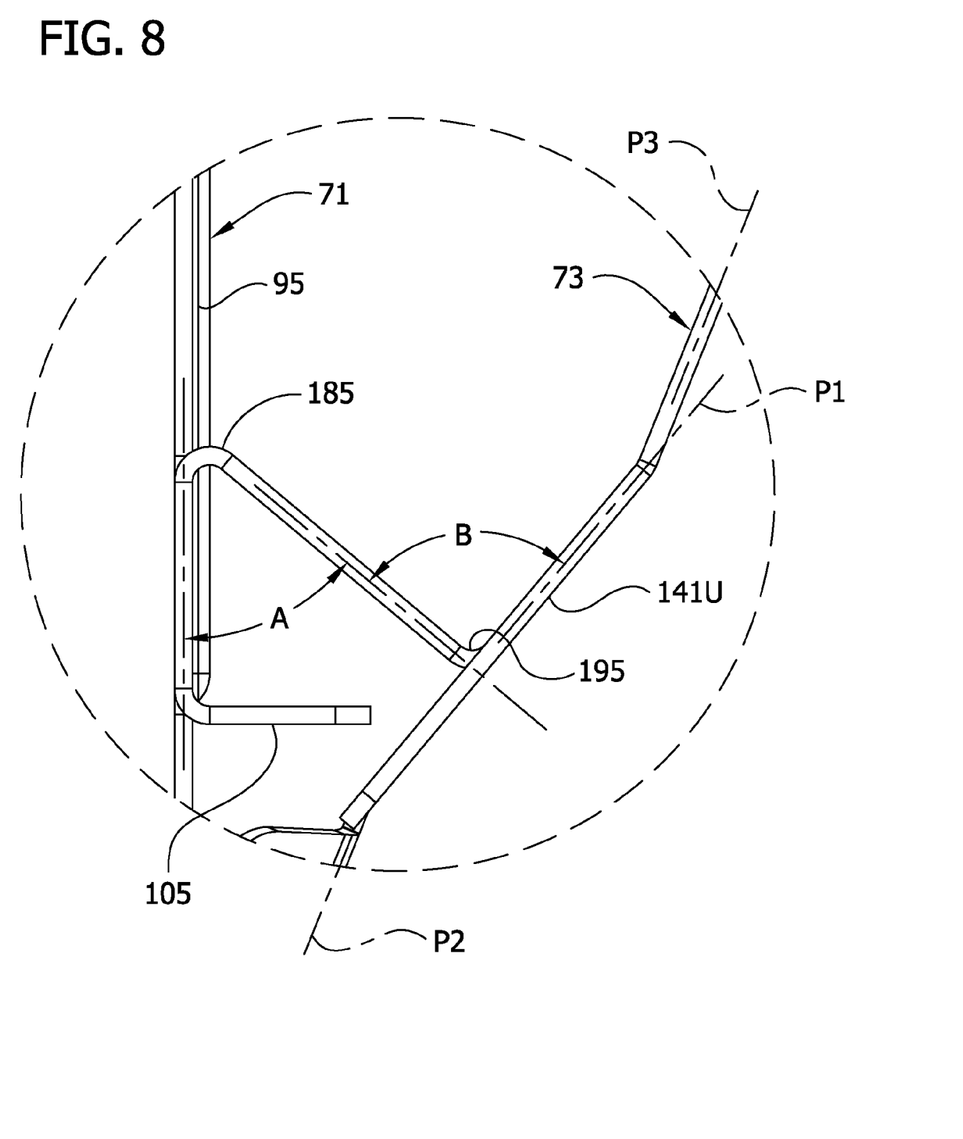
FIG. 8 is an enlarged portion of FIG. 7 showing details of a spring member connecting the front and rear jaws.

Referring to FIGS. 3-8, the bracket 15 comprises front and rear jaws generally designated 71 and 73, respectively, movable between open and closed positions, as exemplified in FIGS. 6 and 7. As will be described, the jaws 71, 73 are movable toward their open position for allowing movement of the bracket 15 relative to the mounting bar 25, as during installation of the bracket on the bar or adjustment of the position of the bracket along the bar after initial installation, and the jaws are movable toward their closed position for gripping the mounting bar at a selected position along the mounting bar. As shown in FIG. 5, when the bracket 15 is installed on the mounting bar 25, the front jaw 71 contacts the front face of the web 51 of the bar 25 and the rear jaw 73 contacts the in-turned lips 57 of the flanges 53 of the bar. The jaws are biased by a spring generally indicated at 81 toward their closed position (see FIG. 3). The bracket 15 also includes a device, generally designated 85, for attachment of the electrical box 21 to the bracket.

Figure 3:
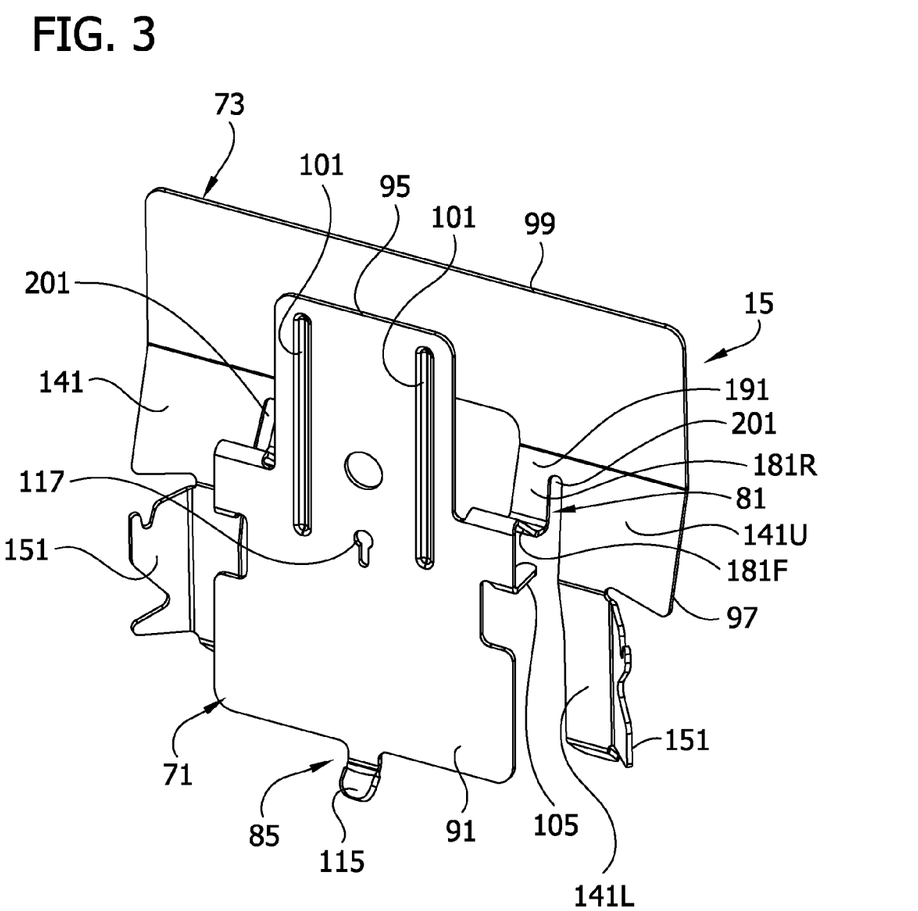
FIG. 3 is a front perspective of the bracket of FIG. 1.
Figure 4:
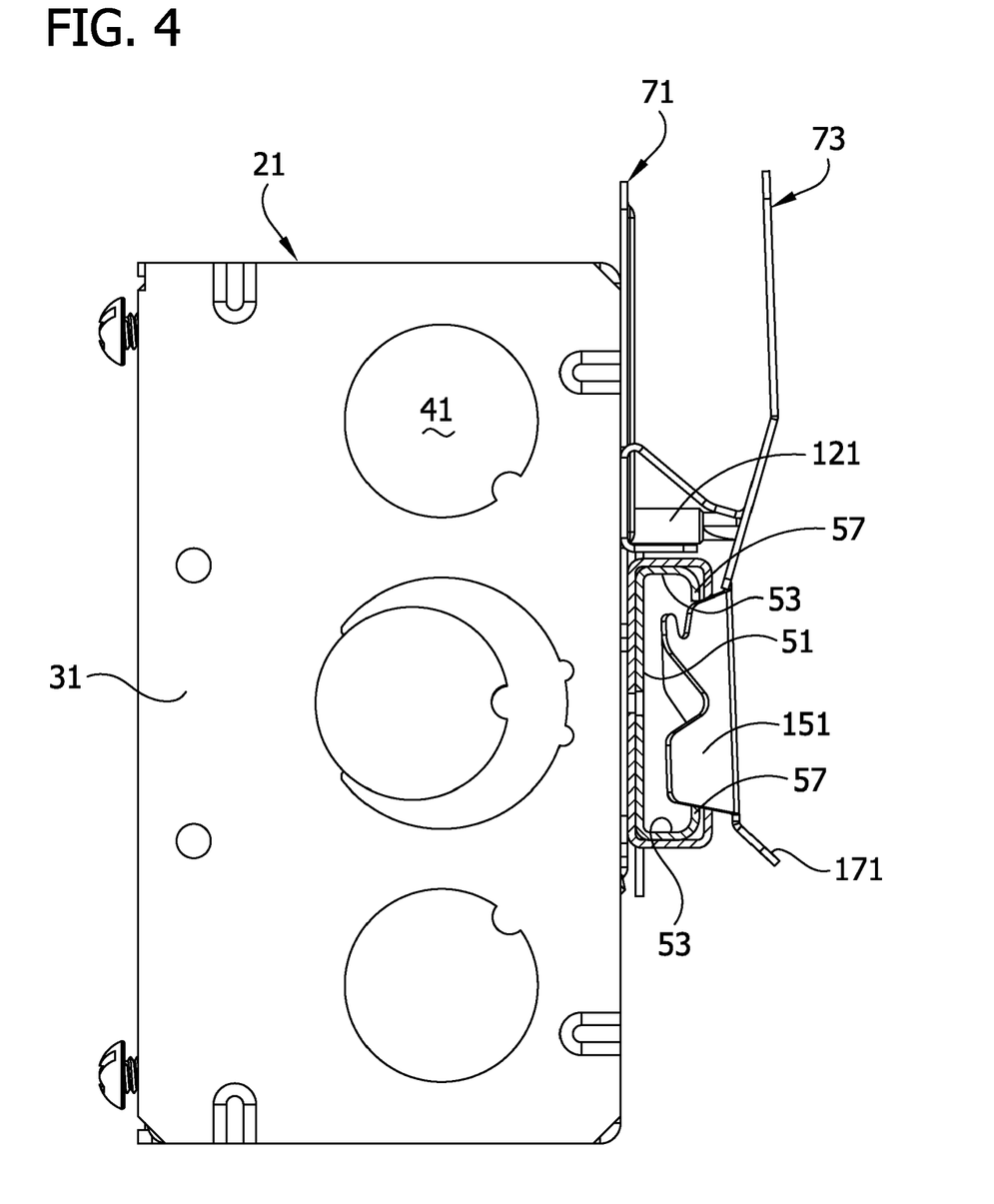
FIG. 4 is an enlarged vertical section on line 4-4 of FIG. 1.

Referring to FIG. 3, the front jaw 71 comprises a front jaw body 91 adapted for clamping contact with the front side of the mounting bar 25 and a front jaw extension 95. The rear jaw 73 comprises a rear jaw body 97 adapted for clamping contact with the rear side of the mounting bar 25 and a rear jaw extension 99. The front and rear jaw extensions 95, 99 are squeezable against the bias of the spring 81 for moving the jaws toward their open position. Desirably, the front jaw 71, rear jaw 73 and spring 81 are integrally formed from a single piece of bent material (e.g., sheet metal). Each of these components is described in detail below.

The front jaw body 91 is generally rectangular in shape and substantially planar. (Other shapes are possible.) The front jaw extension 95 extends upward from the jaw body 91 and is generally co-planar with the front jaw body. As shown in FIG. 3, the extension 95 is also generally rectangular, but it may have other configurations. Vertical stiffening ribs 101 along the front jaw body 91 and extension 95 provide reinforcement against bending. At least one positioning member 105 and desirably two such members 105 extend rearward from the front jaw body 91 at opposite sides of the body toward the rear jaw 73 for contact with the upper flange 53 of the mounting bar 25. These members 105 function to properly position the bracket in a vertical direction relative to the mounting bar to ensure that the jaws, when closed, are in the desired gripping position, as will be described. The number and configuration of positioning members used can vary from one to two or more.

Referring again to FIG. 3, the device 85 for attachment of the junction box 21 to the bracket 15 comprises a tab 115 on the front jaw body 91 for engaging the box 21 and a fastener hole 117 in the front jaw body for receiving a fastener 121 to attach the box to the front jaw 71. In the illustrated embodiment, the tab 115 is integrally formed with the front jaw body 91 and extends down and forward from the lower edge 125 of the jaw body. The fastener hole 117 is generally vertically aligned with the tab 115 and is located toward the upper end of the front jaw body 91. Desirably, the fastener hole 117 has a thread impression for receiving a self-tapping screw or other fastener, such as the fastener 121. To mount the electrical box 21 on the bracket 15, the tab 115 is inserted in an opening 131 in the back wall 35 of the box (see FIG. 5). A fastener (e.g., screw 121) is then inserted through an opening 135 in the back wall of the box 21 and threaded into the fastener hole 117 in the front jaw 71. Other mechanisms or devices may be used for attaching the box 21 to the bracket. By way of example but not limitation, any combination of one or more fastener holes and/or one or more fastening tabs and/or one or more clips or other devices can be used to secure the box to the front jaw 71.

As best illustrated in FIGS. 3, 5, 7 and 8, the rear jaw body 97 comprises a pair of spaced-apart legs 141 having upper portions 141U lying in a first plane P1 and lower portions 141L lying in a second plane P2 extending obliquely relative to the first plane P1. The two legs 141 are connected at their upper ends by the rear jaw extension 99 which spans the two legs and lies in a third plane P3. As shown in FIG. 5, plane P3 is generally parallel to but offset rearward of the stated second plane P2 to provide a spacing between the front and rear jaw extensions 95, 99 sufficient to enable the jaws to move between their open and closed positions. As illustrated in FIG. 3, the two legs 141 of the rear jaw 73 are disposed generally adjacent opposite sides the front jaw body 91 when the jaws are closed.

Referring to FIGS. 5-7, the lower portions 141L of the two legs of the rear jaw 73 are configured for reception between the in-turned lips 57 of the mounting bar 25 when the bracket 15 is installed on the bar. In the illustrated embodiment, the lower portion 141L of each leg has a clamping formation 151 extending generally forward (with an outward flare) for reception between the in-turned lips 57 of the mounting bar. These formations 151 have upper edges 155 and lower edges 157 configured for pressure (clamping) contact against the in-turned lips 57 of the bar. Further, the formations 151 have hooks 161 adjacent the outer (free) ends of their upper edges 155 for catching the adjacent in-turned lips 57 of the bar 21 to prevent the bracket 15 from falling out of position if the bracket is used upside down, i.e., in an orientation where the jaw extensions 95, 97 point down instead of up. The lower end of each leg 141 is bent in a rearward direction to provide a lead-in 171 between the lower ends of the front and rear jaws 71, 73 to facilitate placement of the bracket on the mounting bar.

The spring 81 integrally connecting the front and rear jaws 71, 73 comprises a pair of spring members 181 disposed above the positioning members 105 and projecting rearward from the front jaw body 91 adjacent opposite sides of the body. Referring to FIGS. 3 and 7-9, each spring member 181 comprises a front portion 181F having a generally convex upper juncture 185 with the upper edge 189 of the front jaw body 91, and a rear portion 181R having an upper juncture 191 with the rear jaw 73. The front and rear spring portions 181F, 181R extend down from their respective upper junctures 185 and are integrally connected at a generally concave lower juncture 195. In the illustrated embodiment, the rear spring portions 181R of the two spring members 181 extend alongside the upper portions 141U of respective legs 141 of the rear jaw 73. In this embodiment, the rear spring portions 181R are generally co-planar with the upper leg portions 141U of the legs 141 (i.e., in plane P2) and separated from the legs by slots 201. Also, as is apparent from the flat pattern of FIG. 9, each spring member 181 is tapered toward the rear jaw 73, i.e., the width of the spring member 181 decreases in the direction toward the rear jaw, so that the front spring portion 181F has a first spring rate and the rear spring portion 181R has a second spring rate less than the spring rate of the front spring portion.

By way of example but not limitation, when the jaws 71, 73 are in their closed position (FIGS. 7 and 8), the angle of inclination A of the front spring portion 181F relative to the front jaw body 91 is desirably no greater than about 90 degrees, more desirably in the range of 30-60 degrees, and even more desirably about 50 degrees. Angle B between the front and rear spring portions 181F, 181R is desirably about 90 degrees. The taper angle C of each spring member 181 (FIG. 9) is desirably greater than zero degrees and less than 45 degrees, more desirably less than about 20 degrees, and even more desirably about 11 degrees. Other spring configurations for biasing the jaws 71, 73 toward their closed position are possible. By way of example, the spring 81 may comprise only one spring member connecting the front and rear jaws, or the spring may comprise three or more spring members connecting the two jaws. Further, the spring member(s) and jaws may be formed as an integral one-piece part or as separate parts.

The above spring configuration provides an acceptable range of jaw movement while also maintaining the overall bracket/box depth 215 in FIG. 5 substantially less than the 3.625 in. depth dimension of wall cavities using 3.625 in. deep studs. In one embodiment, dimension 217 is desirably in the range of about 0.5-1.0 in., and more desirably about 0.71 in. Desirably, the spring configuration described above provides an acceptable level of gripping (clamping) force sufficient to hold the bracket 15 in place on the mounting bar 25 while still allowing the bracket to be repositioned along the bar by forcibly sliding the bracket along the bar. In one embodiment, the spring 81 provides a jaw-gripping or clamping force sufficient to resist up to about 15-25 pounds (e.g., about 20 pounds) of force applied to the bracket in a direction parallel to the bar 25 without movement of the bracket 15.

Figure 10:
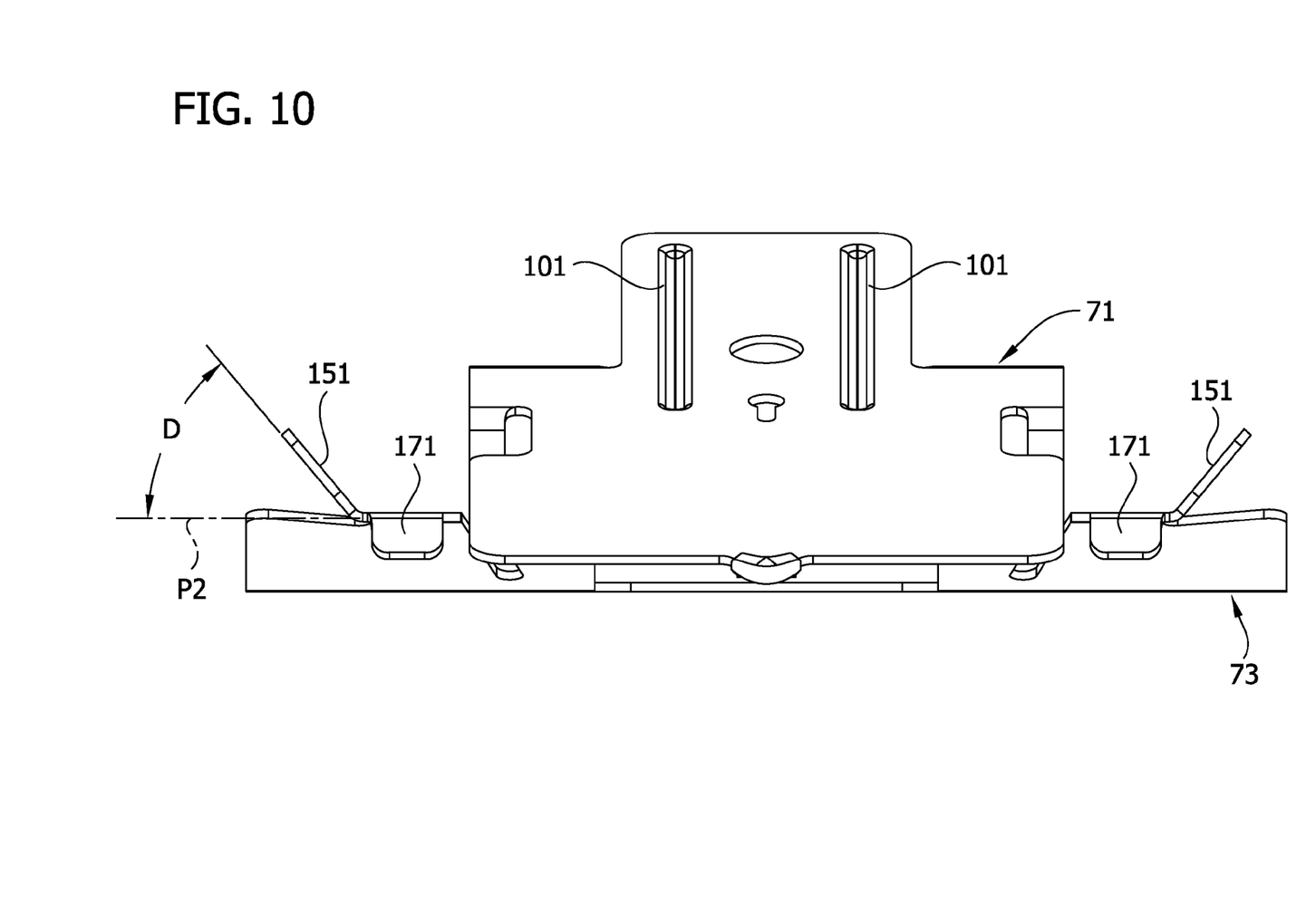
FIG. 10 is a bottom view of the bracket showing an outward flare of clamping formations on the rear jaw.
Figure 11:
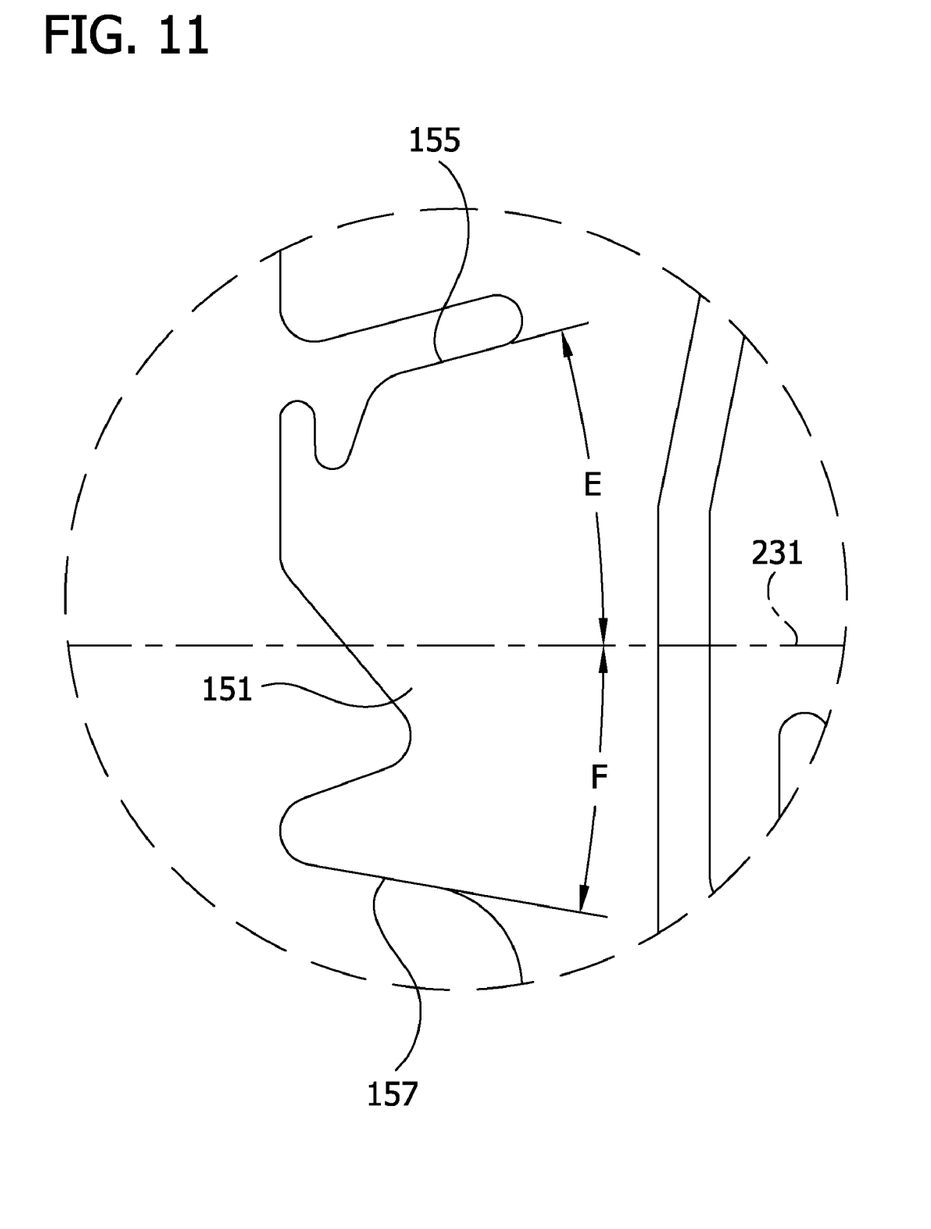
FIG. 11 is an enlarged portion of FIG. 9 showing angles of the upper and lower edges of a clamping formation.
Figure 12:
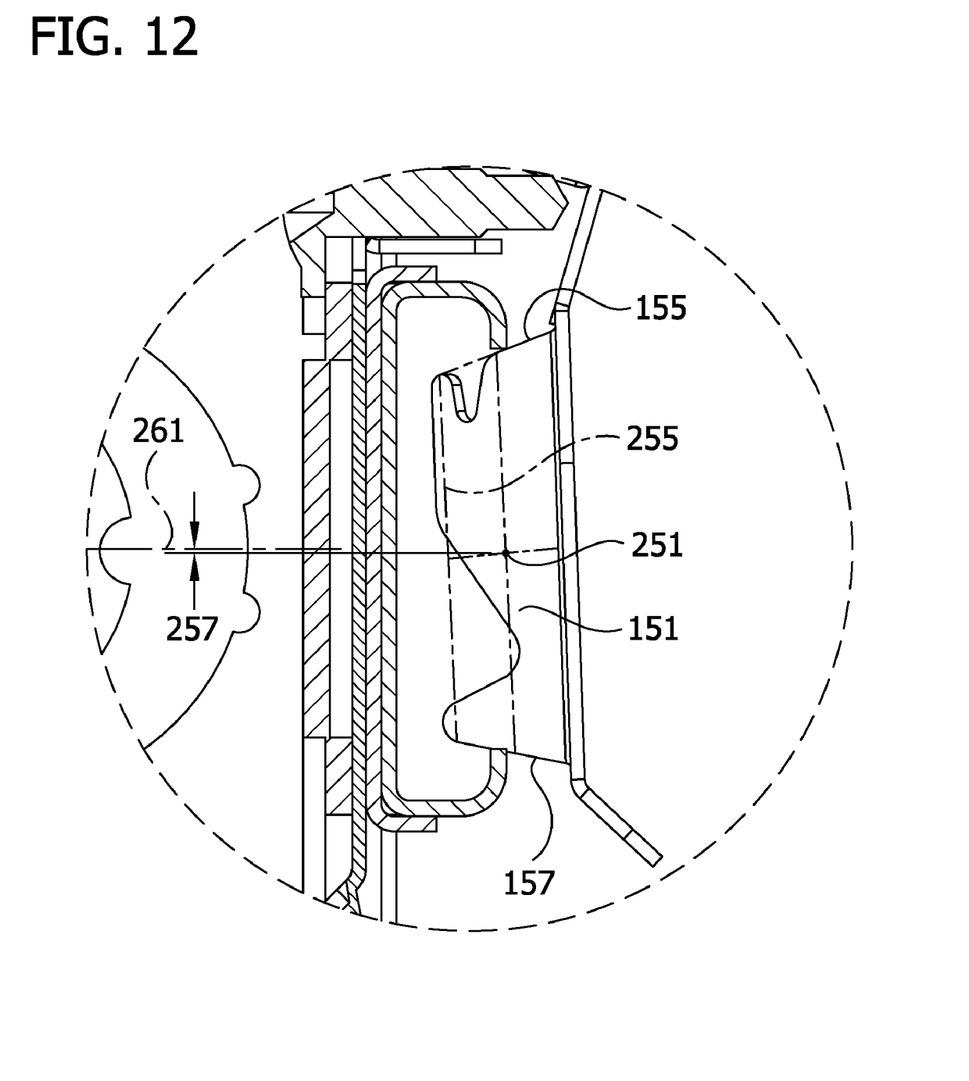
FIG. 12 is an enlarged portion of FIG. 4 showing details of the bracket relative to the electrical box.

Other relevant dimensions of the bracket 15 are shown in FIGS. 10-12. FIG. 12 is a bottom view of the bracket 15 showing the clamping formations 151 on the rear jaw 73 flaring outward at an angle D relative to the plane P2 of the lower leg portions 141L. Desirably, this angle D is in the range of 20-160 degrees, more desirably less than 90 degrees, even more desirably in the range of 20-60 degrees, and even more desirably about 50 degrees, the exact angle being determined by the desired amount of clamping force to be applied by the clamping formation to the mounting bar, among other factors.

Figure 9:
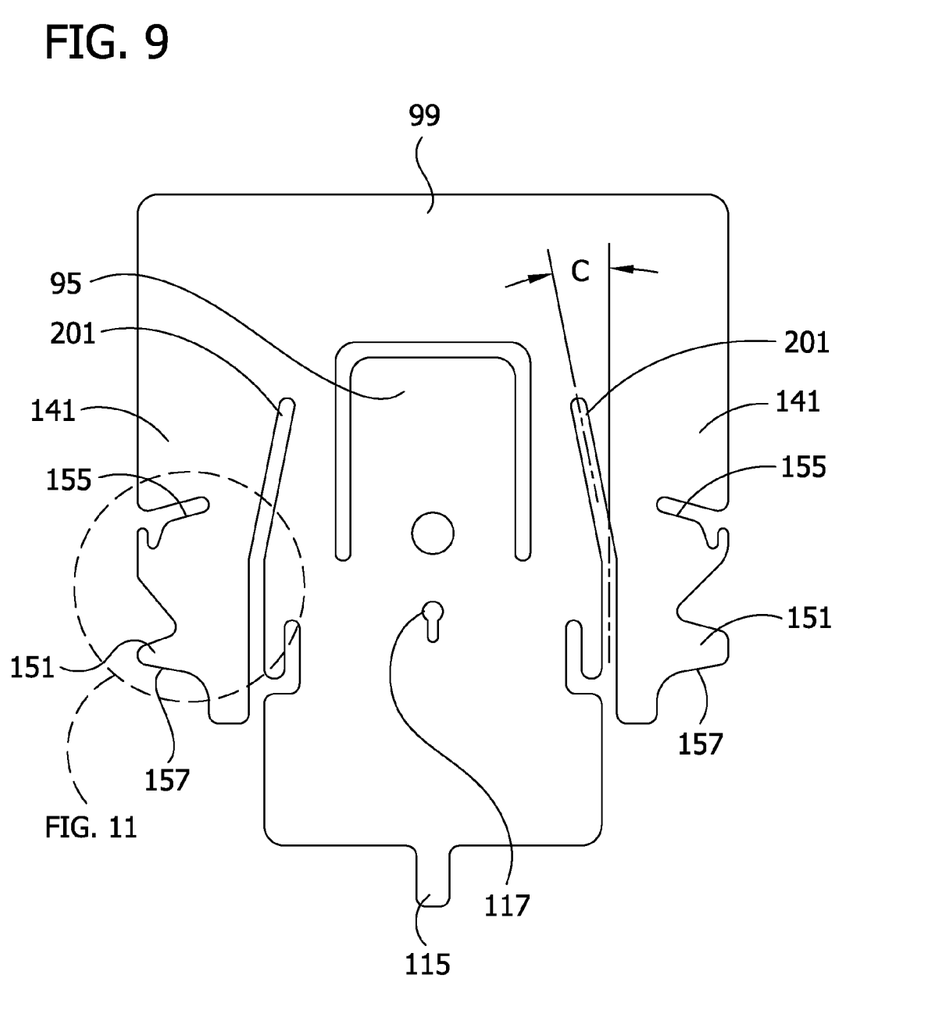
FIG. 9 is a flat pattern illustrating how the bracket is made from a single piece of sheet metal.

FIG. 11 illustrates exemplary angles E and F of the upper and lower edges 155, 157 of the clamping formations 151 relative to a horizontal line 231 on the flat pattern of FIG. 9. These angles E, F are small enough (less than about 35 degrees) to help the clamping formations 151 wedge tightly into the in-turned lips 57 of the mounting bar 25 and large enough (greater than about five degrees) to allow the edges 155, 157 of the clamping formations 151 to fit against the in-turned lips taking into account manufacturing variances. In one embodiment, the angles E and F are about 15 degrees and 10 degrees, respectively.

Figure 13:
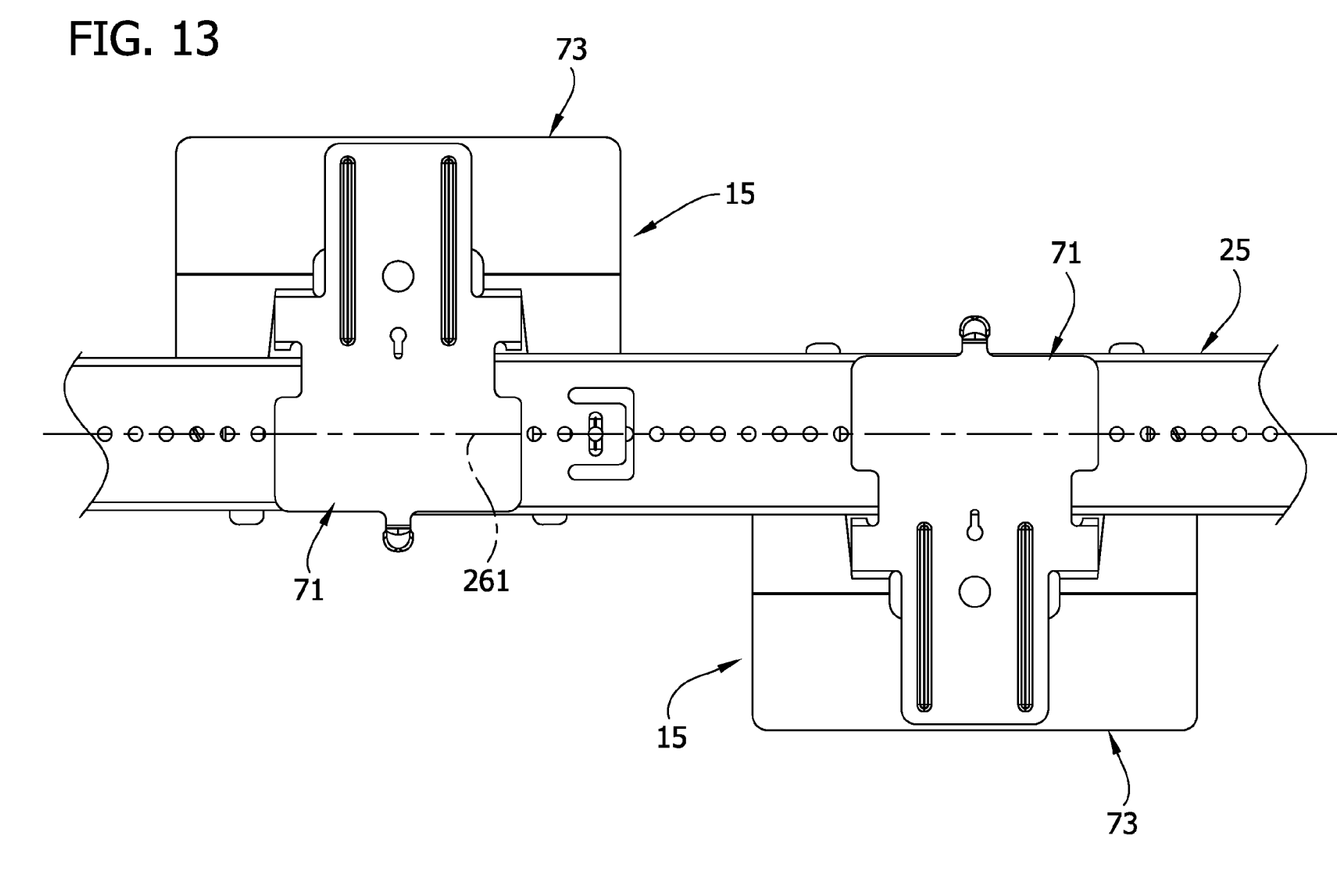
FIG. 13 is a rear view of two brackets installed on a mounting bar, one of the brackets being installed right side up and the other installed upside down.

FIG. 12 shows a geometric center 251 of a trapezoid 255 defined in part by the upper edge 155 of each clamping formation 151 extended to the tangent of the hook 161 and by the lower edge 157 of the clamping member. Desirably, when the bracket 15 is mounted on the bar 25 in the position shown, the geometric center 251 closely aligns with the vertical centerline 261 of the box 21, e.g., within 0.15 in. or less as indicated by dimension 257 in FIG. 12. (The vertical centerline 261 of the box may also correspond to the vertical centerline of the mounting bar 25.) As a result, the bracket 15 can be installed on the bar 25 either right side up as shown in FIG. 12 or upside down as shown in FIG. 13 while maintaining the vertical centerline 261 of the box at substantially the same elevation.

In one manner of use, the mounting bar 25 is attached in a generally horizontal orientation to adjacent wall studs by attaching the fastening flaps 65 of the bar to the studs. After the mounting bar 25 is in place, the bracket is installed on the bar at any selected position along the bar by manually squeezing the jaw extensions 95, 99 to open the jaws 71, 73 (FIG. 6) and then moving the bracket to a position in which the mounting bar is received between the jaws and the positioning members 105 against the top flange 53 of the bar. The jaws 71, 73 are then allowed to move toward their closed position under the bias of the spring 81 to the clamping position shown in FIG. 5 in which the front jaw body 91 clamps against the web 51 of the mounting bar 25 and the clamping formations 151 on the rear jaw 73 clamp against the in-turned lips 57 of the mounting bar to secure the bracket in place in the selected position. The electrical box 21 is mounted on the bracket 15 by inserting the mounting tab 115 on the front jaw 71 into the opening in the box, and then using the screw fastener 121 to fasten the box to the front jaw. Alternatively, the box 21 may be attached to the front jaw 71 before the bracket is installed on the mounting bar. In still another manner of use, the bracket 15 and/or junction box 21 may be assembled with the bar at a remote location and installed as a unit in the field. The box 21 itself may be empty when mounted on the bracket 15 or it may be pre-wired, noting that the current trend is toward pre-wiring an electrical box before it is installed in the field. In some applications, it may be desirable to install more than one electrical box 21 on a mounting bar 25. In this situation, more than one bracket 15 is installed on the mounting bar, each in the manner described above.

In the event the position of the electrical box 25 is to be adjusted after it has been mounted on the bar 25, as may occur after the drywall is installed, the box can easily be re-positioned by moving the bracket along the bar. This can be accomplished by using a tool (e.g., hammer) to tap the bracket 15 or box 21 sideways, causing the jaws 71, 73 to slide along the bar while they continue to maintain their grip on the bar, or by squeezing the jaw extensions 95, 99 toward an open position and then sliding the bracket 15 sideways to the desired position.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A bracket for mounting an electrical box on a mounting bar, said bracket comprising
   front and rear jaws movable between open and closed positions, the jaws being movable toward said open position for allowing movement of the bracket relative to the mounting bar and toward said closed position for gripping the mounting bar at a selected position along the mounting bar,
   said jaws being biased toward said closed position, and
   a device for attachment of an electrical box to the bracket,
   wherein each jaw comprises a jaw body adapted for contact with a respective side of the mounting bar and a jaw extension, the jaw extensions of the jaws being squeezable against said bias for moving the jaws toward said open position,
   wherein said jaws are biased toward said closed position by a spring integrally connecting said jaw bodies in spaced apart relation, wherein said spring comprises two spring members extending between said first and second jaws, and wherein each spring member comprises a front spring portion connected to the front jaw and a rear spring portion connected to the rear jaw, the front spring portion having a first spring rate and the rear spring portion having a second spring rate less than the first spring rate.

2. A bracket for mounting an electrical box on a mounting bar, said bracket comprising front and rear jaws movable between open and closed positions, the jaws being movable toward said open position for allowing movement of the bracket relative to the mounting bar and toward said closed position for gripping the mounting bar at a selected position along the mounting bar, said jaws being biased toward said closed position, and a device for attachment of an electrical box to the bracket, wherein each jaw comprises a jaw body adapted for contact with a respective side of the mounting bar and a jaw extension, the jaw extensions of the jaws being squeezable against said bias for moving the jaws toward said open position, wherein said jaws are biased toward said closed position by a spring integrally connecting said jaw bodies in spaced apart relation, wherein said spring comprises two spring members extending between said first and second jaws, wherein each spring member comprises a front spring portion angling down from the front jaw and a rear spring portion angling down from the rear jaw, and wherein said front and rear jaws and said spring members are formed as a single piece of bent sheet metal.

3. A bracket as set forth in claim 2 wherein said front spring portion has an upper juncture with the front jaw, wherein said rear spring portion has an upper junction with the rear jaw, and wherein said front and rear spring portions have a lower generally concave juncture with one another.

4. A bracket as set forth in claim 1 further comprising at least one positioning member on the front jaw configured for contact with an upper surface of said mounting bar to position the bracket relative to the mounting bar.

5. A bracket as set forth in claim 1 wherein said bracket is configured for mounting said electrical box on said mounting bar of generally channel shape having a web and generally parallel flanges extending from the web, the front jaw being configured for contact with said web on a front side of the bar and the rear jaw being configured for reception between said flanges on a rear side of the bar.

6. A bracket as set forth in claim 1 wherein said front and rear jaws are formed as a single piece of sheet metal.

7. A bracket as set forth in claim 1 in combination with said mounting bar, said mounting bar being of generally channel shape and comprising a web and generally parallel flanges extending from the web, the front jaw being configured for contact with said web on a front side of the bar and the rear jaw being configured for reception between said flanges on a rear side of the bar.

8. A bracket as set forth in claim 7 wherein said front jaw comprises at least one positioning member on the front jaw configured for contact with an upper one of said flanges of the mounting bar to position the bracket relative to the mounting bar.

9. A bracket for mounting an electrical box on a mounting bar, said bracket comprising a front jaw adapted for attachment of an electrical box to the jaw, a rear jaw, the front and rear jaws being movable between open and closed positions, the jaws being movable toward said open position for allowing movement of the bracket relative to the mounting bar and toward said closed position for gripping the mounting bar at a selected position along the mounting bar, and a spring urging the jaws toward said closed position, the front jaw, rear jaw and spring being integrally formed as a single piece of sheet metal, wherein said front jaw comprises a front jaw body, said rear jaw comprising a rear jaw body including a pair of spaced apart legs disposed on opposite sides of the front jaw body, wherein said legs have clamping formations extending forward from the legs configured for clamping contact with said mounting bar, wherein said spring comprises a pair of spring members adjacent opposite sides of the front jaw body connecting the front jaw body to the rear jaw, and wherein each spring member comprises a front spring portion angling down from the front jaw and a rear spring portion angling down from the rear jaw, said front spring portion having an upper juncture with the front jaw, said rear spring portion having an upper junction with the rear jaw, and said front and rear spring portions having a lower generally concave juncture with one another.

10. A bracket as set forth in claim 9 wherein the front spring portion has a first spring rate and the rear spring portion has a second spring rate less than the first spring rate.

* * * * *